(12) United States Patent
Haldopoulos

(10) Patent No.: US 6,217,545 B1
(45) Date of Patent: Apr. 17, 2001

(54) FILTER WITH VARYING DENSITY WHICH IS RESPONSIVE TO FLUID FLOW

(75) Inventor: Ioakim Ike Haldopoulos, Fairburn, GA (US)

(73) Assignee: Porex Technologies Corp., Fairburn, GA (US)

( * ) Notice: Subject to any disclaimer, the term of this patent is extended or adjusted under 35 U.S.C. 154(b) by 0 days.

(21) Appl. No.: 09/246,544

(22) Filed: Feb. 8, 1999

(51) Int. Cl.[7] ................................................. A61M 31/00
(52) U.S. Cl. .............................. 604/57; 210/263; 210/264
(58) Field of Search ................................ 210/263, 264, 210/282, 290, 483, 488, 497.01; 604/57

(56) References Cited

U.S. PATENT DOCUMENTS

| | | |
|---|---|---|
| 2,811,808 | 11/1957 | Briese . |
| 3,190,505 | 6/1965 | Arbitman et al. . |
| 4,119,125 * | 10/1978 | Elkins ..................................... 141/11 |
| 4,151,092 * | 4/1979 | Grimm et al. ........................ 210/256 |
| 4,268,275 * | 5/1981 | Chittick ................................... 48/111 |
| 4,581,013 | 4/1986 | Allen . |
| 4,792,333 | 12/1988 | Kidder . |
| 4,800,018 * | 1/1989 | Moser ................................. 210/266 |
| 4,981,468 | 1/1991 | Benefiel et al. . |
| 4,995,976 * | 2/1991 | Vernes et al. ........................ 210/266 |
| 5,045,195 * | 9/1991 | Spangrud et al. .................... 210/266 |
| 5,156,737 * | 10/1992 | Iana et al. ............................. 210/266 |
| 5,222,940 | 6/1993 | Wilk . |
| 5,236,415 | 8/1993 | Stallings . |
| 5,273,649 * | 12/1993 | Magnusson et al. ................. 210/232 |
| 5,456,831 * | 10/1995 | Sullivan ................................ 210/266 |
| 5,518,613 * | 5/1996 | Koezur et al. ........................ 210/266 |
| 5,718,681 | 2/1998 | Manning . |
| 5,733,448 * | 3/1998 | Kaura ................................... 210/238 |
| 5,928,512 * | 7/1999 | Hatch et al. .......................... 210/266 |

* cited by examiner

*Primary Examiner*—Richard K. Seidel
*Assistant Examiner*—Kevin C. Sirmons
(74) *Attorney, Agent, or Firm*—Venable, Baetjer, Howard & Civiletti, LLP; Andrew C. Aitken

(57) ABSTRACT

A filter is provided within a transparent drinking straw. The filter has a dense core region and a less dense outer peripherial region. The filter is retained in place within the straw by frictional forces under static conditions. The frictional forces which maintain the filter in place under static conditions may be overcome by fluid flowing through the straw causing the filter to move within the conduit. The filter may support particulate matter which may be a medication or drug. Accordingly, the device may be used as delivery device for drugs administered by oral ingestion. Movement of the filter from a first to a second position provides a visual indication that a predetemined volume of fluid has passed through the conduit.

21 Claims, 3 Drawing Sheets

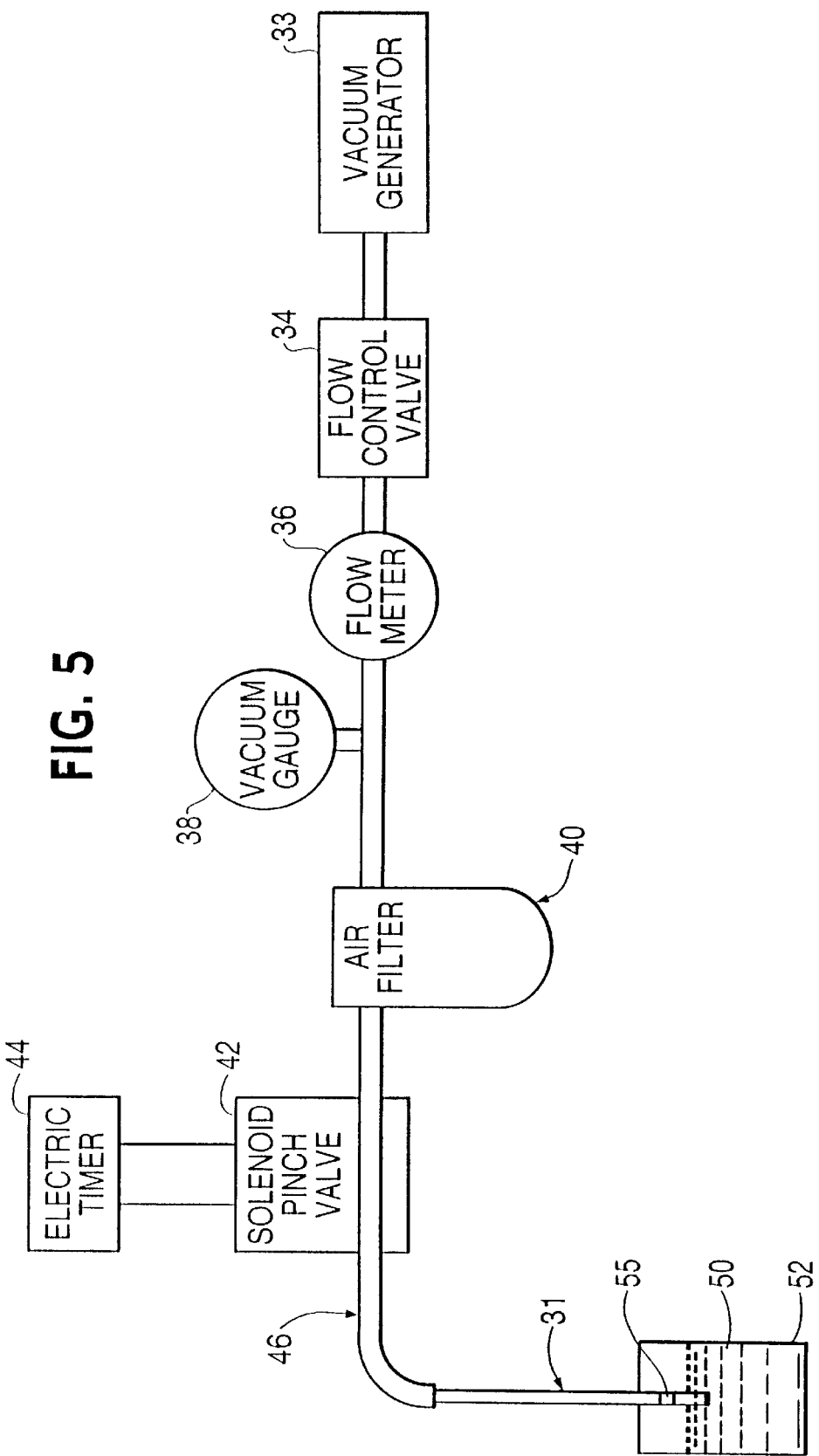

FILTER WITH VARYING DENSITY WHICH IS RESPONSIVE TO FLUID FLOW

The present invention relates to a filter and its use in conjunction with a tubular conduit. The filter is specifically constructed to fit within a conduit in such a manner that enables it to move in response to flow of liquid under certain conditions. According to the invention, the filter is constructed to have at least two distinct regions, a central core region having a more dense construction and an outer peripheral region having a less dense construction. A filter constructed in such a manner and to predetermined dimensions which compliment the dimensions of a conduit, may be seated within the conduit under relatively static conditions but may travel within the conduit in response to flow of liquid through the conduit. The filter is constructed so that frictional forces maintain the filter in place when it is under static conditions and when it is subject to forces from the flow of air necessary to draw liquid up through the conduit. In the preferred embodiment of the invention, these forces are analogous to the conditions created by an individual drawing air through a filter seated within a conventional drinking straw. The filter is constructed to allow for the passage of air through the conduit with an insignificant pressure drop across the filter. When liquid traveling through the conduit comes in contact with the filter, the force of the liquid on the filter overcomes the frictional forces holding the filter in place within the conduit and causes the filter to move.

In a preferred and contemplated embodiment, the device as described above is used in conjunction with a medication delivery system for oral ingestion.

BACKGROUND OF THE INVENTION

Filters are routinely used within conduits for filtration and their use in such applications is both well known and widespread. In most applications filters are designed to be securely seated against the forces of fluid flow. In connection with prior art directed to the provision of oral medications, it is known to use filters as a substrate to support medication within a conduit such as a drinking straw. Such devices typically contain a single dose of medication which, in some circumstances, is supported by either a screen or a porous material which is wedged between the sidewalls of the straw. Some devices may provide a separate support structure to maintain the screen or filter in place. The prior art also discloses the use of solid impediments which will move within a conduit in response to fluid flow in connection with other applications. Such solid impediments typically have a diameter less than the diameter of the conduit and thus are not designed to frictionally engage the conduit or to be retained in a stationary position. One application where such solid impediments are used is in connection with the regulation and or metering of fluid flow.

In connection with the provision of oral medications, straws are frequently used to administer a single dose of a drug. In such devices, fluid enters the straw, passes through the filter, then puts the drug into suspension or solution, and next exits the opposite end of the straw. It is desirable to provide a substrate which would support the drug and allow the patient to draw liquid through the straw and, enable the substrate to move a predetermined distance depending on the volume of fluid which passed through the straw. The movement of the substrate in the device in response to fluid flow would provide a visual indication as to whether a predetermined amount of fluid had passed through the straw and consequently was ingested by a patient. Accordingly, it is one object of the invention to provide a substrate which will both support medication within a straw, allow for the administration of the medication and further allow the substrate to move in response to the flow of fluid. It is a further object of the present invention to provide a material within a conduit which will remain seated within the conduit in response to fluctuations in air pressure, however move in response to fluid flow under conditions analogous to those created and typically encountered using a drinking straw. A further object of the invention is to provide a substrate which allows air to freely travel through an impediment and thus exhibit no response to air flow however, when liquid is allowed to contact the impediment, the impediment may move in response to the flow. A further object of the present invention is to provide a device which provides an indication of whether a predetermined amount of fluid has passed through a conduit. Yet a further object of the invention is to provide a device to assist in the oral delivery of solid medication which provides an indication of whether or not a predetermined amount of fluid has passed through the liquid and thereby provide an indication as to whether or not medication has been ingested. A further object of the invention is to provide a device which is appealing and which provides encouragement to children by providing a positive indication that a medication has passed through a conduit.

SUMMARY OF THE INVENTION

According to the invention, a filter is constructed from synthetic fibers and provided within a conduit. Both the filter and conduit are manufactured to precise specifications in order to meet certain performance criteria relating to the movement of the filter under preselected operating conditions. In order to construct the filter which will meet the desired performance criteria in a reproducible manner, the various operating parameters are first identified including the dimensions of the conduit and expected forces acting upon the filter. For example, the expected pressure differentials applied to conduits in order to initiate and maintain flow of fluid through the conduit are determined.

In the preferred embodiment, a filter is provided which will remain stationary within the conduit until it is subjected to forces from the flow of liquid. In this embodiment, the filter remains stationary within the conduit as air is drawn through the conduit to cause fluid to rise up into and flow through an opening of the conduit. When the flow of fluid comes into contact with the filter, the force imposed by the fluid will dislodge the filter and allow it to move along the tubular passage. The filter impediment is designed to travel from the upstream end of the conduit, along the distance of the conduit until it is impeded by a constriction provided within the conduit at the downstream end. Upon the interruption of fluid flow, the filter impediment is retained in a stationary position at the opposite, downstream end of the conduit.

In a preferred embodiment the conduit is similar to a conventional drinking straw having a uniform inner diameter oriented in a substantially vertical position however the ends are modified to prevent the filter from passing out of the straw. The flow of fluid through the straw is accomplished by a person sucking on the downstream end of the straw, located at the upright end. It is contemplated that flow through a conduit could be effected in alternative manners which subject the filter contained therein to analogous forces and, both the movement of the filter and the performance of the device would be substantially similar. For example, in a further contemplated embodiment, flow through the conduit is initiated by drawing back a plunger creating a vacuum in the conduit, such as accomplished using a conventional syringe. In another contemplated embodiment, the conduit is an overflow channel and flow is initiated by gravity. In yet a further contemplated embodiment, a conduit is in communication with a flexible reservoir and flow of the fluid is initiated by compression of the reservoir.

In the preferred embodiment, upon application of suction by an individual to the top of the straw, the filter impediment will rapidly travel up the straw until further upward movement is physically impeded by a constriction in the straw. The desired performance characteristics are achieved and optimized by creating a filter having variable densities, wherein a central core region is more dense than an outer peripheral region. While the inner core region provides an increased resistance to flow, the less dense outer peripheral section enables the filter to provide a light frictional force against the sidewalls of the conduit. In the preferred embodiment, the filter is comprised of oriented fibers and the density of the filter is altered by changing the distribution of the fibers. Because the density of the filter is lower along the peripheral region of the filter, fluid traveling through the conduit may flow at a faster rate through the peripheral region. It is contemplated that the increased rate of flow through this region also reduces the frictional forces holding the filter in place against the sidewalls of the conduit. Under normal laminar flow conditions, the flow rate through a conduit would be expected to be at its maximum rate at the innermost region of the conduit due to the frictional forces imposed by the sidewalls of the conduit on the fluid. However, when the filter as described herein is positioned within the conduit, the flow of liquid past the filter will be fastest along the outside or periphery of the conduit and correspondingly is slower through the interior core region having the highest density of fibers. The faster fluid flow around the edges of the filter creates a region having less pressure directly behind or downstream of the filter which may serve to further facilitate movement of the filter through the conduit. It is believed that the flow dynamics associated with the flow through the conduit past a filter having the variable density as described above significantly contributes to the desired movement and performance characteristics of the filter within the conduit.

In the preferred embodiment, the oriented fiber filter is placed in a transparent drinking straw and the flow is created by the creation of a vacuum on the top of the straw applied by a person. A powdered medication is provided within the straw and is supported by the filter. In addition to serving as a support medium for the medication, the filter prevents the medication from being dispensed out of the lower end of the straw.

BRIEF DESCRIPTION OF THE DRAWINGS

FIG. 5 is a schematic representation of an apparatus used to test the filter and conduit combination made in accordance with the invention.

DETAILED DESCRIPTION

Figure 1:
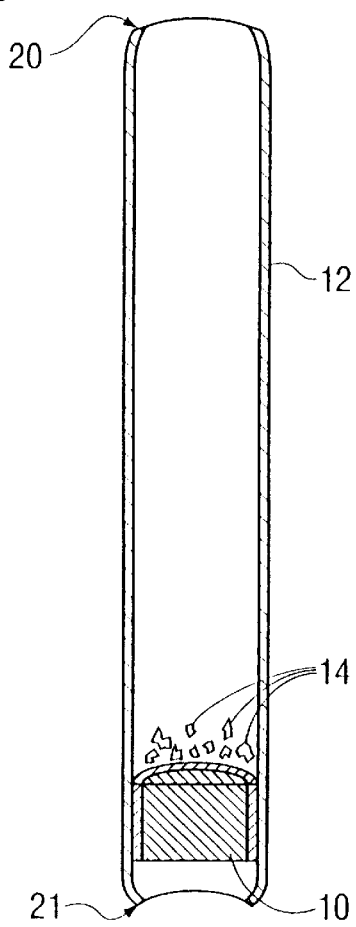
FIG. 1 is a sectional view of a conduit containing a filter.
Figure 2:
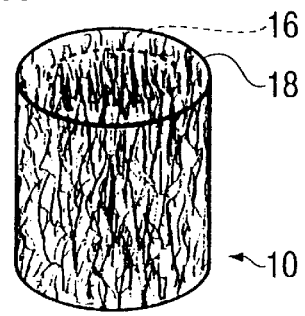
FIG. 2 is a plan view of a first embodiment of a filter used in connection with the device.
Figure 3:
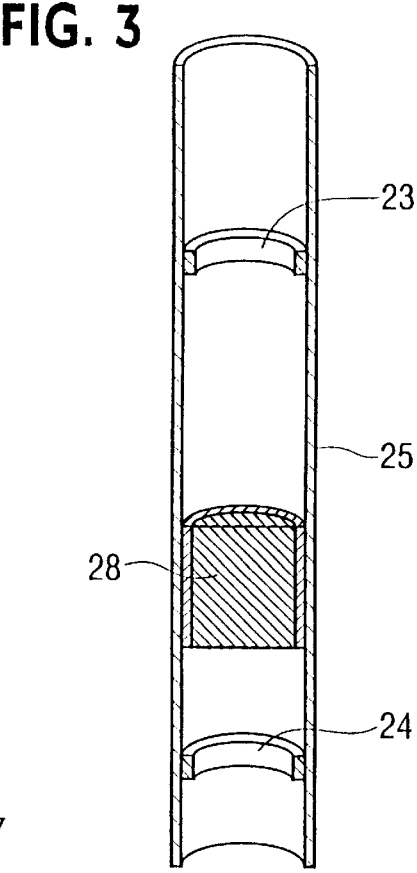
FIG. 3 is an alternative embodiment of a conduit and filter according to the invention.

Referring now to FIG. 1 a first contemplated embodiment of the invention is shown where the invention is used in connection with a transparent conduit such as a drinking straw. Filter 10 is provided within a transparent cylindrically shaped conduit 12 on top of which is provided a powdered medication 14. The filter provides support for the solid medication 14 and prevents the release of medication out of the bottom of the conduit. Filter 10 is generally formed in the shape of a cylinder and is comprised of a bundle of synthetic fibers, the majority of which are generally oriented in a direction parallel with conduit 12. As best seen in FIG. 2, filter 10 has an inner more dense core region 16 and a second less dense annular region 18 which surrounds the core. The less dense annular region 18 located at the outer periphery of filter 10 enables the filter to engage the interior sidewalls of the conduit by a light frictional engagement. In the absence of significant forces acting upon filter 10, the filter 10 will remain fixed in its position. The filter is constructed so that a number of fibers in the peripheral region extend in a radial direction with respect to the orientation of the fiber bundle within the conduit. The fibers or portions of the fibers which extend in a radial direction function like springs which frictionally engage the sidewalls of the conduit. Since the filter has a less dense fiber distribution in this peripheral region 18, the forces acting on sidewall of the conduit are less than what would be expected to be encountered by a filter having a uniform density. The filter is constructed so that its maximum diameter is somewhat larger than the inner diameter of the conduit and, when inserted within the conduit will slightly compress to conform to the diameter of the conduit. The inner dense core region 16 of the filter functions to increase the resistance to fluid flow of the filter in the central region.

Figure 4:
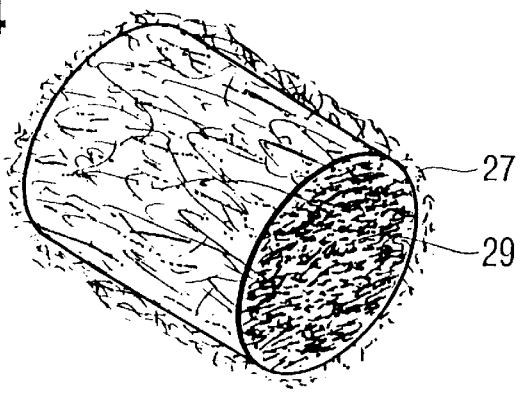
FIG. 4 is an alternative embodiment of the filter used in connection with the invention.

In the embodiment depicted in FIG. 1, conduit 10 is constricted on its opposite ends 20 and 21 whereby the inner diameter of the ends are less than the maximal interior dimension of the conduit located in the median section. The constrictions of the ends of the conduit serve to prevent the filter from passing out of the conduit in response to fluid flow through the conduit. FIG. 4 shows a another contemplated embodiment of the invention where an annular insert 23 and 24 are provided within the conduit to decrease the inner diameter of the conduit 25 at opposite ends and thus prevent movement of the filter element 28 within the conduit beyond a predetermined distance. An alternative embodiment of a filter which may be used in accordance with the invention is depicted in FIG. 4. In this embodiment the region 27 of lower density is also formed at the peripheral region however the radial dimension of the annular section is significantly less than the radius of the more dense core region 29. In the second embodiment, the central core region 29 is manufactured to equal approximately the same diameter as the diameter of the conduit of which it is designed to compliment. Like the first embodiment, the filter is retained in place by frictional forces imposed by the fibers located in the outer low density region 27. The total frictional forces between the filter and the conduit may be increased by providing a filter having a greater axial length or causing more of the fibers to extend in the radial direction thereby increasing the density of the outer peripheral region. Although the embodiments show herein depicted filters having two distinct regions, in other contemplated embodiments the density of the filter gradually decreases from the central axis of the filter towards the outer peripheral region, or may contain multiple distinct regions having different densities.

In an example a conduit was provided with a minimum inner diameter of 0.278 inches and a maximum inner diameter of 0.282 inches and a length of about eight inches. A filter made of a bundle of synthetic fibers was created using an annular die having an inner diameter between 0.306–0.310 inches. In this example fibers comprised of a polyester core and a polyolefin sheath and having a weight of 60 grains per yard were heated to a temperature of approximately 450 degrees F and then drawn through the die at a rate of 1.5 feet per minute. The die was maintained at a temperature of approximately 85 degrees F. The heat causes the resin to slightly melt and the fibers will adhere to one another. Because of the temperature of the die is less than the operating temperature, those fibers located on the periphery begin to cool faster than those fibers located at the core. The process also causes some of the fibers located at and near the periphery to extend in a radial direction giving the filter a hairy appearance as illustrated in FIG. 4. The filters were then cut to an axial length of approximately 0.31 inches. The filters made according to this process have a cylindrical shape and have a diameter slightly greater than the die used in the manufacturing process. The filters are resilient and can be compressed to fit within the conduit and thus conform to the dimensions of the conduit set forth above. The filter expands in a radial direction to create a frictional engagement with the sidewalls of the conduit.

Filters made in accordance with the manufacturing parameters set forth above were tested in a device which is schematically depicted in FIG. 5. FIG. 5 shows a vacuum generator 33 connected to a conduit 31 in communication with a flow control valve 34. A flow meter 36 measures the flow of air through the device and vacuum gage 38 measures the vacuum on the system. An air filter 40 serves as a trap for water drawn into the system and protects the vacuum source and other downstream instrumentation. Upstream from the air filter 40 is a pinch valve 42 activated by a solenoid and controlled by electric timer 44. The tubing 46 is flexible and engages the top of conduit 31 which contains filter 55 which was made according to the process described above. The testing is conducted by first priming the system by drawing water into the tubing 46 and then connecting the tubing to the conduit 31. Conduit 31 has a substantially smooth interior and has an inner diameter of between 0.278–0.282 inches and a length of approximately eight inches. The vacuum 33 is set at 3 in/Hg@5LPM flow rate and applied to the conduit for a time interval of one second. Energizing the vacuum causes liquid 50 to be drawn from reservoir 52 into the lower end of conduit 31. The fluid flows through filter 55 and continues to flow upwards through conduit 31 and into tubing 46. As the liquid flows through filter 55 it pushes the filter upward within the confines of conduit 31. After one second, the timer sends a signal to activate the solenoid which closes valve 42. Closing valve 42 isolates vacuum generator 33 from acting on the conduit and flow is arrested. At this time the conduit is removed from the fluid reservoir and separated from the tubing 46. Any residual fluid is allowed to flow out of the bottom of conduit 31. The foregoing procedure closely simulates the forces imposed by a person on a conventional drinking straw and was designed as a performance test to determine the precise dimensions and manufacturing parameters necessary to construct a device which will consistently exhibit the desired properties of allowing a filter to move up the conduit and having the filter retained at the top of the conduit after the vacuum is released.

Figure 6A:
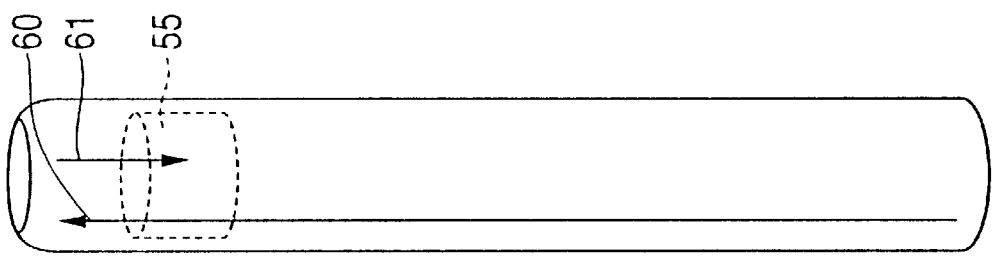
FIG. 6a is a schematic representation of a filter within a transparent conduit in the initial position prior to subjecting it to predetemined conditions by the apparatus depicted in FIG. 5.
Figure 6B:
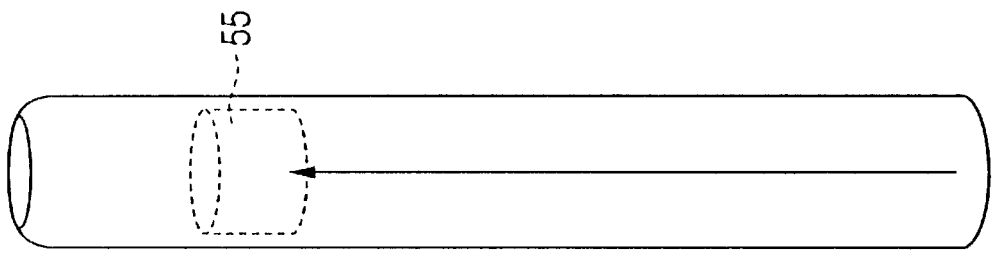
FIG. 6b is a schematic representation of the filter shown in FIG. 6a after exhibiting the desired performance characteristics in response to predetermined test criteria.
Figure 6C:
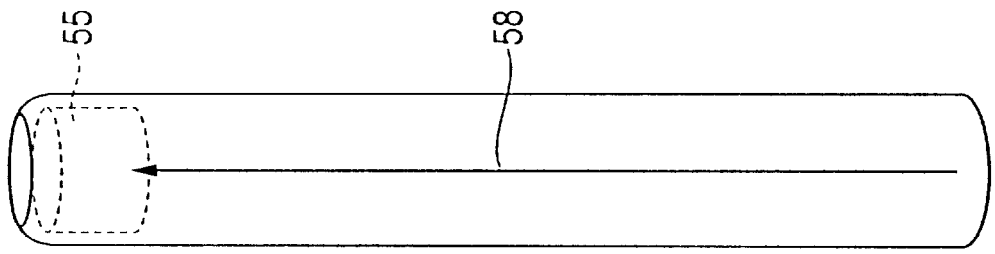
FIG. 6c is a schematic representation of the filter of FIG. 6a which does not exhibit desired performance characteristics in response to the predetermined test criteria.
Figure 6D:
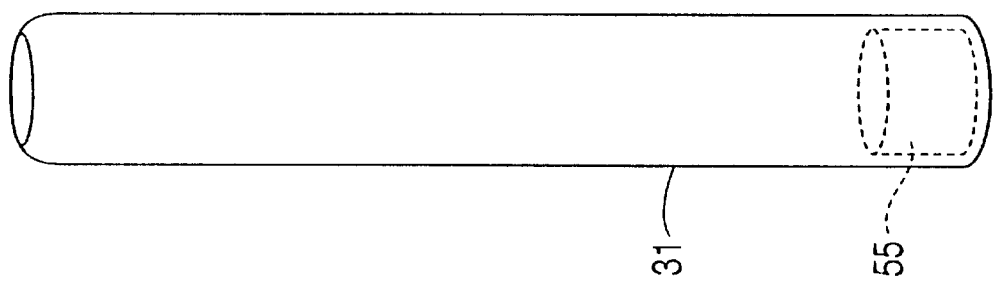
FIG. 6d is a further schematic representation of the filter depicted in FIG. 6a which does not exhibit the desired performance characteristics in response to the predetermined test criteria.

Using the apparatus depicted in FIG. 5, twenty filters made in accordance with the manufacturing specifications described above were tested and the position of the filter was noted at the end of each test iteration. FIG. 6a depicts the filter 55 at the initial position within a conduit before the test as described above was performed. FIG. 6b depicts the filter 55 which has exhibited the desired performance characteristics after being subject to the test procedures as set forth above. In FIG. 8b filter 55 is shown after it has traveled from the initial position at the bottom of the conduit as depicted in FIG. 8a to a position at the top of the conduit and, has retained its position at the top of the conduit after the liquid was withdrawn from the reservoir. The arrow 56 represents the vector of travel of the filter within the conduit. Filters considered to have failed the requisite performance test are illustrated in FIGS. 6c and 6d. In FIG. 6c a filter 60 is depicted at an intermediate position within the conduit and accordingly, did not travel to the top of the conduit after application of the vacuum for a time period of one second. Another failure mode is shown in FIG. 6d where a filter 62 did not retain its position at the top of the conduit. In FIG. 6d the arrow represents the where the filter traveled to the top of the conduit and then traveled back to an intermediate location within the conduit. The twenty filters constructed in accordance with the manufacturing specifications described in the preferred or first embodiment were tested and each satisfactorily traveled to the top of the conduit and remained in place after removal of the conduit from the liquid as depicted in FIG. 6b reflecting a 100 percent pass rate.

In the embodiment described above, the filter will consistently move up to the conduit in response to the fluid flow created by suction applied by an individual directly on top of the conduit. Providing a filter having a variable density assists in achieving the desired results because the outer annular region is provides less total pressure against the walls of the conduit than a filter having an uniform distribution of fibers. At the same time, the region of increased density located at the center of the filter serves to increase the filter's resistance to fluid flow.

The construction and concomitant characteristics of oriented fiber filters may be altered by changing various parameters governing the manufacturing process used to make the filters including (1) the fibrous materials used for the construction of the filter, (2) the temperature conditions at various steps and of various components in the manufacturing process, (3) the rate of which the filter fibers pass through the die, (4) and the cutting procedure. Alteration of the various manufacturing parameters can effect the density, the size and radial resilience of the filter and accordingly, the performance characteristics of the filter can be effected. For example, by altering the length of the filter, the total circumferential surface area available for the engagement to the conduit sidewalls is altered and, the resulting forces necessary to overcome the frictional engagement are correspondingly increased. Although a single conduit having the precise dimension and a corresponding filter for the conduit is described herein, the invention is applicable to a wide range of combinations of conduits and filters. Other combinations may be made by determining the proper relationship between the conduit, the filter and the range of expected pressure differentials expected through the device in the contemplated application.

It is accordingly contemplated that filters constructed of other materials and from alternative structural matrixes could be satisfactorily engineered to meet the desired performance specifications. To be effective the filters should demonstrate adequate resilient properties in the radial direction which enables the frictional engagement of the the sidewalls of the conduit in the manner described herein. For example, it is contemplated that the performance objectives of the invention could be met using filters having differing structural matrixes and filters made from other materials including polyethylene, polyproplyene, Teflon, or nylon. It is further contemplated that substantially solid impediments having sufficient radial resiliency and channels provided for the facilitation of flow of liquid past the impediment may satisfactory be engineered to perform as required. Thus, it should be understood that various modifications within the scope of this invention can be made without departing from the spirt thereof.

In use, a patient is provided a straw containing a filter which supports a single dose of a medication in powder form or in small particles. Providing medication in powdered form is often advantageous because it enables the drug to be rapidly be absorbed in the alimentary canal. The patient immerses the lower end of the straw into an ingestible fluid such as water, and the patient draws the fluid through the filter and into his or her mouth. As the fluid contacts the medication it is suspended or dissolved into the fluid. As the fluid moves through the filter it also moves the filter up to the top of the straw and, the filter is retained at this position when the patient stops application of suction. The high flow rate into the alimentary canal using a straw allows the administration of medication with minimal perception by the patent and takes advantage of the natural swallowing reflex. The foregoing application provides particular advantage for the oral administration of medication to both pediatric and geriatric patients, especially when the medication is unpalatable.

The foregoing specific embodiments and applications are illustrative only and are not intended to limit the scope of the invention. It is contemplated that the invention will be functional and effective in other diverse applications where it is desirable to allow for the movement and subsequent retention of an impediment in response to predetermined pressure differentials and rates of fluid flow within a conduit.

What is claimed is:

1. A device for the simultaneous transmittal and filtration of fluids comprising a filter element and a tubular conduit defining an axial path, said filter element and said conduit comprising an assembly, said conduit having a length with a substantially uniform interior dimension, said filter element contained within said length and positioned to entirely transect a first portion of said axial path and further comprising a plurality of regions, said regions having varying density in a radial direction with respect to one another, and said filter element being resilient in a radial direction, said filter element having a maximum circumferential dimension greater than the circumferential dimension of said conduit whereby said filter element engages the interior sidewall of said conduit in frictional engagement in such a manner to allow for the movement of said filter within said conduit in an axial direction in response to fluid flow and to retain said filter element when said filter element is subjected to gravitational force.

2. The device recited in claim 1 wherein said plurality of regions comprise two regions, a first region having a greater density than a second region said second region surrounding and concentric with said first region.

3. The assembly as recited in claim 1 wherein an axial section through said tubular conduit and said filter element is circular.

4. The device as recited in claim 3 wherein said filter is cylindrically shaped and said second region is an annular shaped peripheral region.

5. The device as recited in claim 3 wherein said filter element comprises an arrangement of fibers wherein the majority of said fibers are oriented in the same direction as said tubular conduit.

6. The device as recited in claim 5 wherein said fibers are comprised of synthetic resin.

7. The filter as recited in claim 6 wherein said synthetic resin fibers are formed from a resin group consisting of polyester and/or polyolefin.

8. The device as recited in claim 1 further comprising solid particles which are supported by said filter.

9. A method of administering a substance to a person comprising, placing a first end of the filter element and tubular conduit assembly as recited in claim 8 into a reservoir of liquid, sucking on the opposite end of said tubular conduit to cause said liquid to flow into said first end of said conduit and through said filter element, allowing said liquid to contact said substrate and suspend said in said liquid, and to flow into the mouth of said individual, wherein said flow of said liquid causes said filter element to move from a first location in said tubular conduit to a second location in said tubular conduit.

10. The device as recited in claim 8 wherein said solid particles comprise a medication or drug.

11. The device as recited in claim 1 wherein said conduit has a dimensions consistent with a conventional straw used for drinking which has dimensions of a length of more than three inches and less than 16 inches in length and an interior diameter dimension of greater than 0.10 inches and less than 1 inch.

12. The assembly recited in claim 1 wherein said filter element is comprised of a matrix of fibers.

13. The device as recited in claim 1 further comprising means to maintain movement of said filter within said conduit within a predetermined distance.

14. The device as recited in claim 13 wherein said means comprise radially extending projections from the interior sidewall of said conduit.

15. The device as recited in claim 1 wherein said conduit comprises a region with substantially transparent sidewalls thereby allowing the visual inspection of said filter element.

16. The device as recited in claim 1 wherein said filter element is a solid cylinder.

17. The device as recited in claim 1 wherein said filter is retained in place when subjected to a pressure differential of approximately 3 in/Hg@5LPM.

18. The device as recited in claim 1 wherein said filter element further comprises a single solid cylindrical porous part made from a material having a uniform composition.

19. A straw and filter assembly wherein said straw is comprised of a tubular member defining an axial path having a length with substantially smooth interior sidewalls and said straw having a substantially uniform interior dimension, and said filter is positioned to entirely transect a first portion of said axial path and is constructed with a material having a varying density from a central core region to an outer peripheral region, said filter having a radial dimension to allow for the frictional engagement of said smooth interior sidewall of said tubular member so as to allow for the retention of said filter in a predetermined first location in said first portion of said path in response to air being drawn through said filter and to allow for the movement of said filter from said first location in response to flow of liquid through said conduit to a second portion of said path.

20. A device for the transmittal of liquids comprising a tubular conduit defining an axial path and an impediment said conduit having a length with a substantially uniform interior dimension, said impediment contained within said length and said impediment positioned to entirely transect a first portion of said axial path and having passages to allow for fluid to flow through said impediment said impediment further comprising a plurality of regions, said regions having varying density in a radial direction with respect to one another, and said impediment being resilient in a radial direction, said impediment having a maximum circumferential dimension greater than the circumferential dimension of said conduit whereby said impediment engages the sidewalls of said conduit in a frictional engagement in such a manner which allows for the movement of said impediment from a first portion of said conduit to a second portion of said conduit in response to fluid flow and the retention of said impediment in a fixed position within said conduit when subjected to gravitational forces.

21. The device as recited in claim 20 wherein said impediment is also retained in place when subjected to a pressure differential of approximately 3 in/Hg@5LPM.

* * * * *